J. DOTTL.
SPRING AND FRAME SUPPORTER FOR MOTOR VEHICLES.
APPLICATION FILED NOV. 16, 1916.
1,225,115.
Patented May 8, 1917.
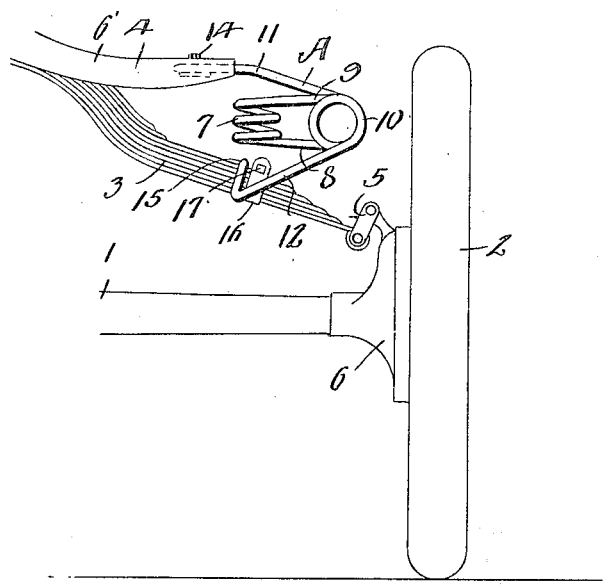
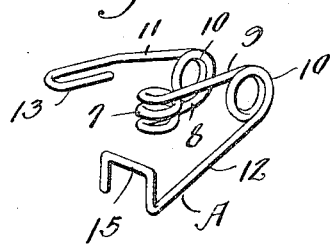
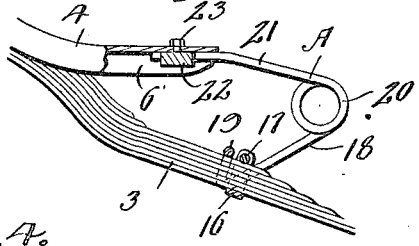
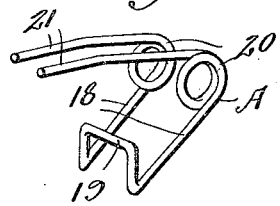
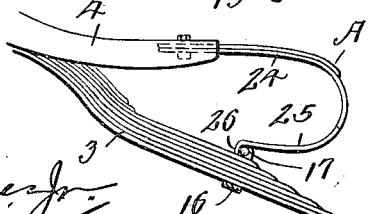
WITNESSES
INVENTOR
J. Dottl,
BY Victor J. Evans
ATTORNEY

UNITED STATES PATENT OFFICE.

JOSEPH DOTTL, OF MADISON, WISCONSIN, ASSIGNOR TO THE DOTTL MANUFACTURING COMPANY, OF MADISON, WISCONSIN, A CORPORATION OF WISCONSIN.

SPRING AND FRAME-SUPPORTER FOR MOTOR-VEHICLES.

1,225,115.  Specification of Letters Patent.  Patented May 8, 1917.

Application filed November 16, 1916. Serial No. 131,724.

*To all whom it may concern:*

Be it known that I, JOSEPH DOTTL, a citizen of the United States, residing at Madison, in the county of Dane and State of Wisconsin, have invented new and useful Improvements in Springs and Frame-Supporters for Motor-Vehicles, of which the following is a specification.

This invention relates to springs and frame supporters for motor vehicles the object in view being to provide in connection with the body supporting bolster and spring or springs of a motor vehicle, means whereby, under an excessive load, the weight of the body and the load imposed thereon will be transferred from one portion of a body supporting spring to another portion thereof thereby preventing the overloading of the vehicle springs which may ultimately result in the bending and breakage thereof, the device thus adapting the vehicle to both light and heavy loads and affording the necessary resilient support for different loads.

By means of the invention hereinafter described, the load on the vehicle may be doubled or materially increased without causing the body supporting spring or springs to bear against or come in contact with the axle or axle housing, the weakest point or points of the spring or springs is protected and the same relieved, and excessive swaying or swinging motion of the body under excessive loads is eliminated and incidentally the tendency to shear off the center bolt, the device serving to sustain the body and its load in an approximately horizontal position and also preventing the sudden upward tilting of the body at one end. Incidentally the device relieves the wear and tear on the tires and also on the car as a whole by preventing the lateral swinging of the body and load when turning corners or traveling over rough road surfaces.

A further object in view is to provide a device of the character referred to which may be readily applied to vehicles now in use without extra fittings.

With the above and other objects in view, the invention consists in the novel construction, combination and arrangement of parts, herein described, illustrated and claimed.

In the accompanying drawings:—

Figure 1 is a rear elevation of a sufficient portion of a motor vehicle to illustrate the present invention in its applied relation thereto.

Fig. 2 is a detached perspective view of the auxiliary spring.

Fig. 3 is a view similar to Fig. 1 showing the use of another form of auxiliary spring.

Fig. 4 is a detached perspective view of the spring shown in Fig. 3.

Fig. 5 is a view similar to Fig. 1, showing another form of auxiliary spring.

Referring to the drawings 1 designates an axle housing, 2 one of the vehicle wheels, 3 one of the body supporting springs, 4 the bolster associated with the spring 3 and 5 one of the end shackles by which the adjacent end of the spring 3 is coupled to the enlarged end portion 6 of the housing 1. The bolster 4 is of the usual arched type and is provided with longitudinal flanges 6' in spaced relation to each other and extending downwardly from the top or body portion of the bolster, all of said parts being of the usual well known construction and relative arrangement.

In carrying out the present invention, I employ an auxiliary spring designated generally at A. This spring under one form is made as shown in Fig. 2, the same comprising a central portion 7 embodying a number of convolutions arranged one above the other and arms 8 extending therefrom and merging into other convolutions 10 disposed at right angles to the convolutions 8, the spring also comprising other arms 11 and 12 extending from the convolutions 10 in the same direction as arms 8 and 9. The arm 11 is terminally recurved to form a slotted end portion 13 which is secured by means of a bolt 14 to the top or body portion of the bolster 4 and between the flanges 6' thereof; the other arm 12 of the spring terminates in an inverted U-shaped or arched portion 15 which embraces the upper side of the spring 3 as shown in Fig. 1 just within or behind the clip 16 which in connection with its bolt 17 serves to bind the leaves of the spring 3 together. Thus the clip 16 and its bolt 17 serve to hold the portion 15 of the spring A always in proper position and in relation to the spring 3.

Under an ordinary load, the spring A is relaxed and does not assist vertically in the support of the load, but when an excessive load is imposed on the vehicle, the spring A which constitutes in effect a resilient end extension of the bolster 4, assists the spring 3 in supporting the load and transfers the greater portion of the load from the central or arched portion of the spring 3 to points adjacent to the clips 16 and adjacent to the opposite extremities of the body supporting spring. Another form of spring is illustrated in Fig. 4, the same comprising the opposite and substantially parallel arms 18 which are connected by an inverted U-shaped or arched portion 19 adapted to fit over the spring 3 in the same manner as the arched portion 15 of the spring shown in Fig. 2. The arms 18 merge into resilient coils or convolutions 20 from which extend other arms 21 which are inserted between the flanges 6' of the bolster 4 where they are engaged by a clamp 22 and confined between said clamp and the top wall or body of the bolster as shown in Fig. 3, the clamp 22 being fixedly secured to the bolster by means of a fastener 23.

Instead of the springs hereinabove described, the auxiliary spring A may be of the leaf type as shown in Fig. 5 and substantially C shaped. The upper arm 24 is secured to the bolster 4 in the same manner as the spring 2 and the lower arm 25 thereof is formed with a terminal downwardly extending lip 26 which engages behind the bolt 17 of the clip 16, the spring last described being thus held in its proper relation at all times to the body supporting spring 3.

The supporter or auxiliary spring hereinabove described, when used in the applied relation to the bolster and body supporting spring, as shown, not only serves to assist the body supporting spring 3 in carrying an excessive load but transfers the load from the central portion of the body supporting spring to points adjacent to the ends of said body supporting spring and furthermore resiliently arrests or cushions the lateral swaying movements of the vehicle body and its load thereby relieving to a great extent, excessive wear and tear on the body and frame of the vehicle as well as the axles and wheels thereof.

I claim: —

1. A vehicle body supporting bolster extending transversely of the wheel base and having parallel longitudinal flanges extending downwardly therefrom, and an arched body supporting main spring centrally secured to the bolster and terminally connected with the axle housing, in combination with auxiliary supporting units interposed between the bolster ends and said spring, each unit consisting of a spring embodying a plurality of convolutions, an upper arm fixedly secured to the body of the bolster between the flanges thereof, and a lower arm adapted to rest upon the body supporting spring and to engage the adjacent clip of the body supporting spring.

2. A vehicle body supporting bolster extending transversely of the wheel base and having parallel longitudinal flanges extending downwardly therefrom, and an arched body supporting main spring centrally secured to the bolster and terminally connected with the axle housing, in combination with auxiliary supporting units interposed between the bolster ends and said spring, each unit consisting of a spring embodying a plurality of convolutions, an upper arm fixedly secured to the body of the bolster between the flanges thereof, and a lower arm adapted to rest upon the body supporting spring and to engage the adjacent clip of the body supporting spring, said supporter being so related to the bolster and body supporting spring as to transfer a portion of the load of the vehicle from the central portion of the body supporting spring to a point adjacent to one end of said body supporting spring.

3. In combination, an axle housing, a bolster extending longitudinally thereof, an arched body-supporting main spring centrally secured to the bolster and terminally connected with the axle housing, and additional springs through which a portion of the load on the bolster is transmitted to the main spring, said additional springs each including a body portion which extends out beyond the corresponding end portion of the bolster and other portions which extend from said body portion toward a vertical plane through the center of the axle housing at right angles to the axle thereof.

4. In combination, an axle housing, a bolster extending longitudinally thereof, an arched body-supporting main spring centrally secured to the bolster and terminally connected with the axle housing, and additional springs through which a portion of the load on the bolster is transmitted to the main spring, said additional springs each including a body portion and end portions extending from the body portion, said end portions lying substantially in the longitudinal vertical plane through the axle housing.

5. In combination, a pair of wheels, a bolster substantially above and extending longitudinally of the common axis of said wheels, means for transmitting loads from said bolster to said wheels, said means including an arched main spring centrally secured to said bolster, and additional springs operatively connected to the corresponding ends of the bolster, said additional springs each including a body portion and end portions extending from the body portion and lying substantially in the longitudinal vertical plane through the common axis of the wheels.

6. In combination, a pair of wheels, a bolster substantially above and extending longitudinally of the common axis of said wheels, means for transmitting loads from said bolster to said wheels, said means including an arched main spring centrally secured to said bolster, and additional springs operatively connected to the corresponding ends of the bolster, said additional springs each including a body portion which extends out beyond the corresponding end of the bolster and end portions extending from the body portion and lying substantially in the vertical plane which includes the common axis of the wheels.

7. In combination, a pair of wheels, a bolster substantially above and extending longitudinally of the common axis of said wheels, means for transmitting loads from said bolster to said wheels, said means including an arched main leaf spring centrally secured to said bolster and having clips whereby the leaves are held in proper relative alinement, and additional springs through which a portion of the load on the bolster is transmitted to the main spring, said additional springs each including a body portion and end portions extending at an angle to the body portion, one of the end portions being associated with the corresponding spring clip.

8. In combination, a pair of wheels, a bolster substantially above and extending longitudinally of the common axis of said wheels, means for transmitting loads from said bolster to said wheels, said means including an arched main leaf spring centrally secured to said bolster and having clips whereby the leaves are held in proper relative alinement, and additional springs through which a portion of the load on the bolster is transmitted to the main spring, said additional springs each including a body portion and end portions extending at an angle to the body portion, one of the end portions being associated with the corresponding spring clip and embracing two sides and the top of the main spring.

9. In combination, a pair of wheels, a bolster substantially above and extending longitudinally of the common axis of said wheels, means for transmitting loads from said bolster to said wheels, said means including an arched main spring centrally secured to said bolster, and additional compression springs operatively connected to the corresponding ends of the bolster, said additional springs each including a body portion a part at least of which is curved in a vertical plane which substantially includes the common axis of the wheels.

10. In combination, a pair of wheels, body supporting means substantially above and extending longitudinally of the common axis of said wheels, means for transmitting loads from said body supporting means to said wheels, said last named means including an arched main spring centrally secured to said body supporting means, and additional compression springs operatively connected to the corresponding end portions of the body supporting means, said additional springs each including a body portion and end portions extending from the body portion and lying substantially in the longitudinal vertical plane through the common axis of the wheels.

11. A motor vehicle comprising an axle housing, body supporting means extending longitudinally thereof, means for transmitting loads from said body supporting means to said housing, said last named means including an arched main spring centrally secured to said body supporting means, and additional compression springs operatively connected to the body supporting means at points removed considerably from the central portion thereof, said additional springs each including a body portion and end portions extending from the body portion and lying substantially in the longitudinal vertical plane through the housing.

In testimony whereof I affix my signature.

JOSEPH DOTTL.

Copies of this patent may be obtained for five cents each, by addressing the "Commissioner of Patents, Washington, D. C."